May 19, 1953  W. F. MITCHELL  2,638,915
FLUID COUPLING
Filed Dec. 13, 1950  4 Sheets-Sheet 1
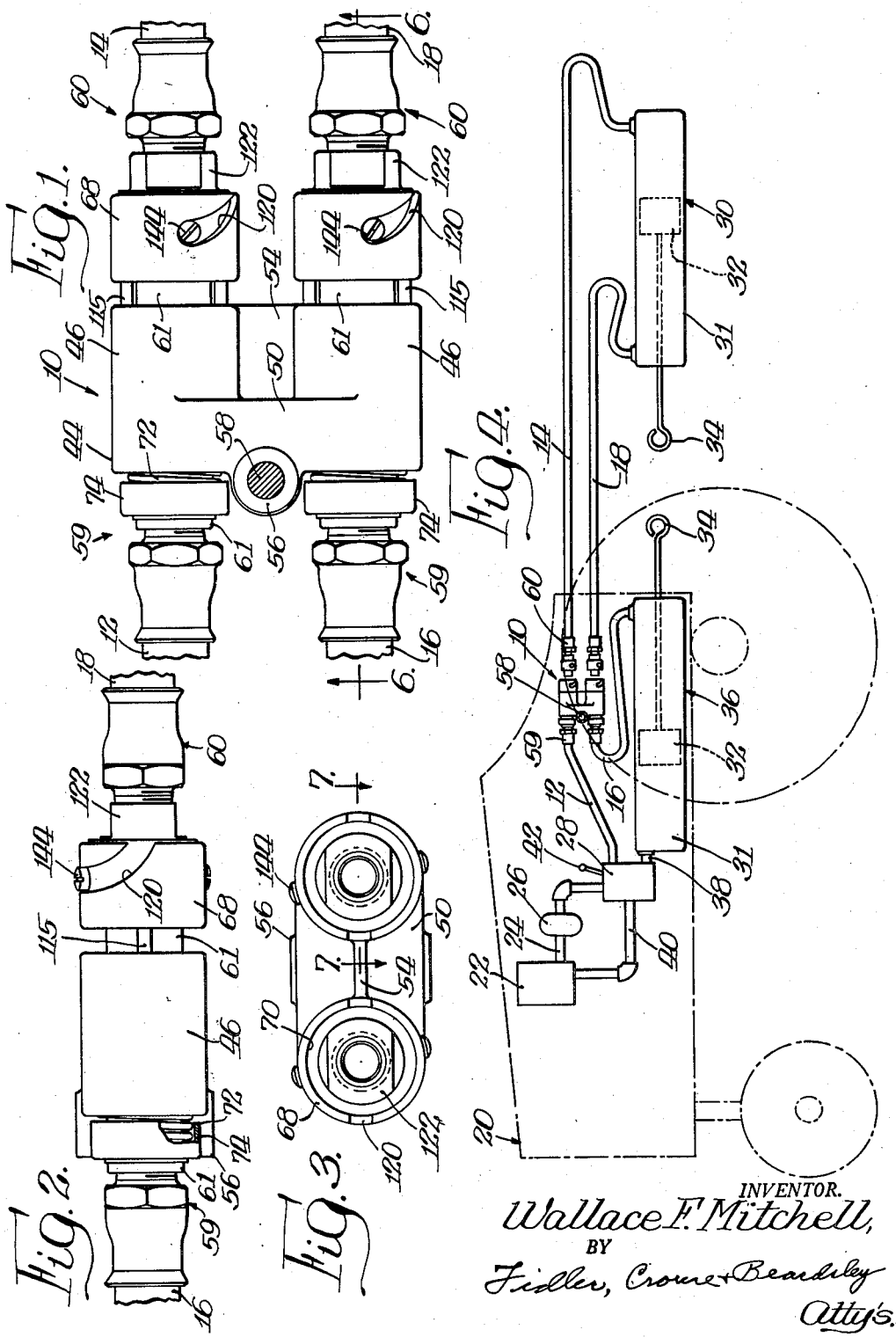
INVENTOR.
Wallace F. Mitchell,
BY
Fidler, Crowe + Beardsley
Atty's.

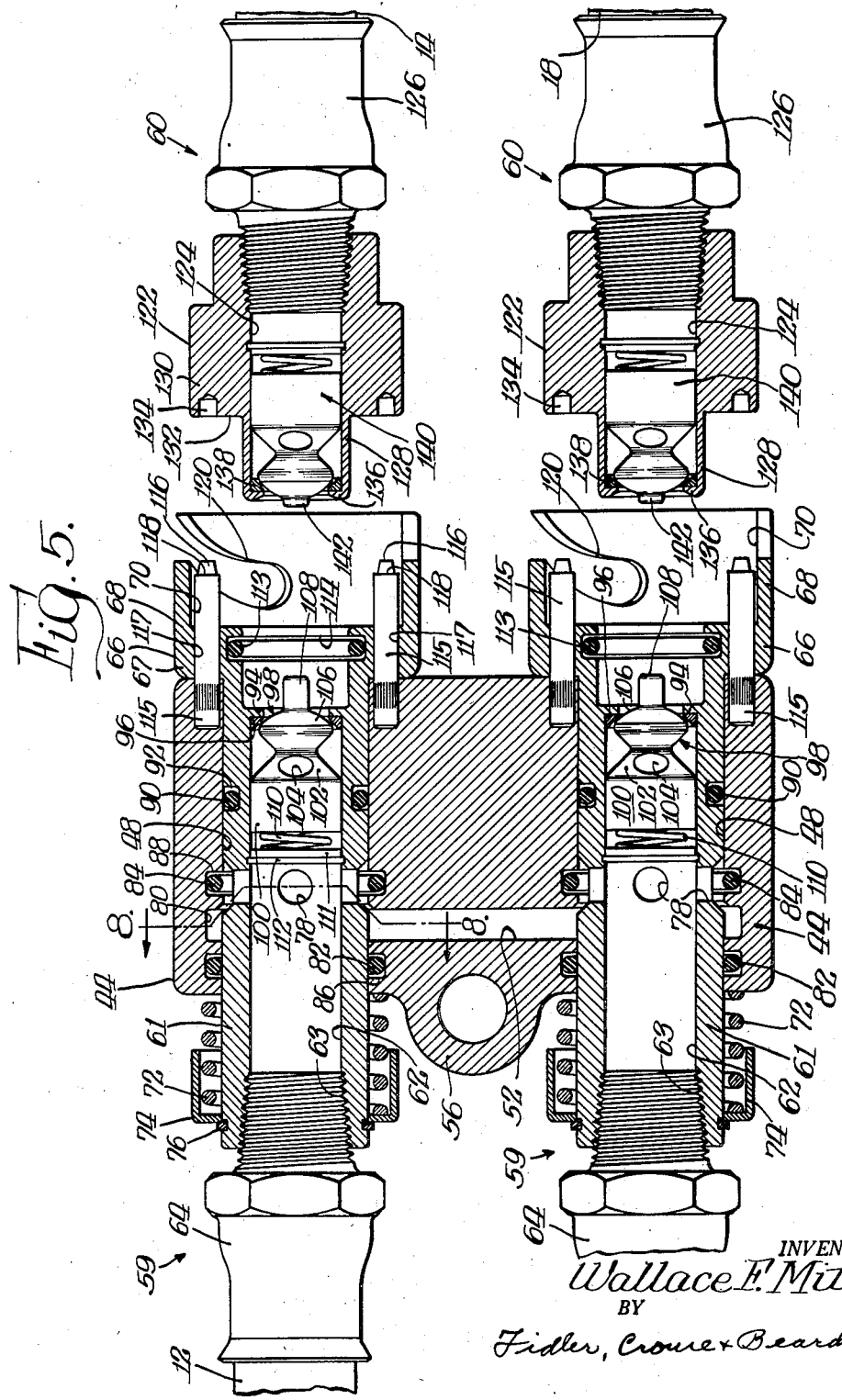

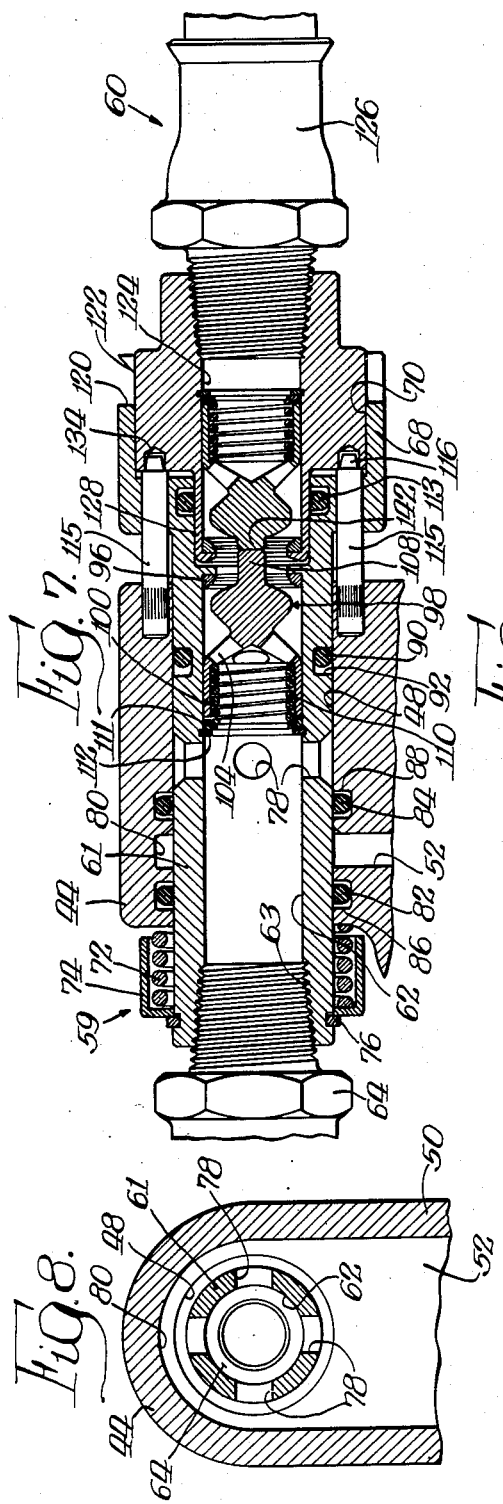

May 19, 1953  W. F. MITCHELL  2,638,915
FLUID COUPLING
Filed Dec. 13, 1950  4 Sheets-Sheet 4
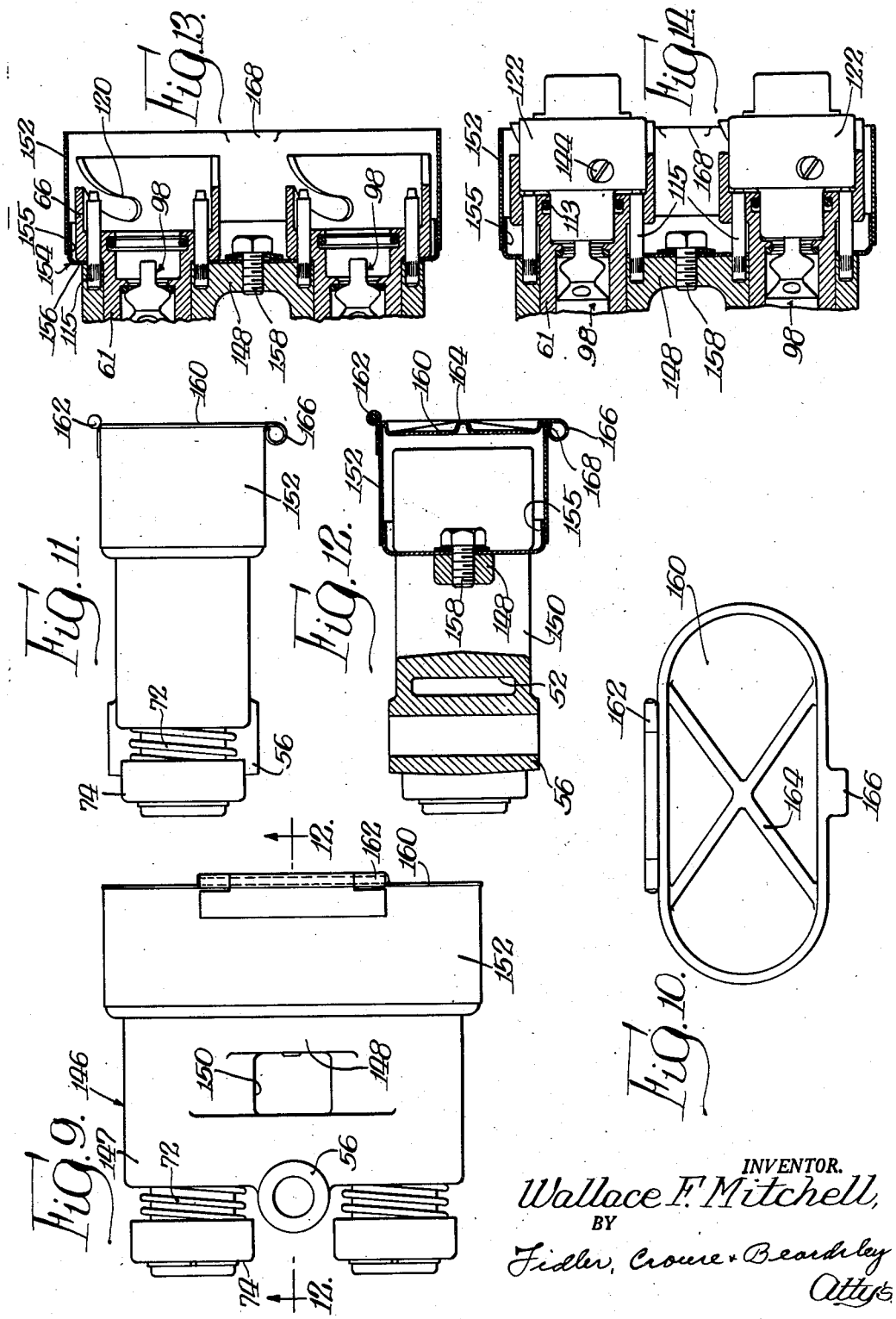
INVENTOR.
Wallace F. Mitchell
BY
Fidler, Crowe & Beardsley
Attys Patented May 19, 1953

2,638,915

UNITED STATES PATENT OFFICE 2,638,915

FLUID COUPLING

Wallace F. Mitchell, Chicago, Ill., assignor to MBG Corporation, Chicago, Ill., a corporation of Illinois Application December 13, 1950, Serial No. 200,659

8 Claims. (Cl. 137—235)

The present invention relates to fluid couplings and has to do more particularly with a multiple coupling unit of the self-sealing breakaway type adapted to connect the two cooperating sections of each of a plurality of conduits and effective upon separation to interconnect automatically at least one set of corresponding sections of the conduits.

Many hydraulic control systems, such, for example, as are used for remote control of the operation of tractor-drawn apparatus, such as earth working or farm implements, are provided with self-sealing breakaway couplings. Such systems customarily embody two conduits each formed in two sections connected respectively to the fluid pressure source, usually mounted on the tractor, and to the fluid pressure actuated motor mounted on the implement. The implement is usually connected to the tractor by a traction connection adapted to separate upon the application of an unusual force thereto, such as occurs when the implement encounters an unusual obstruction, and the breakaway couplings permit concurrent separation of the coupling sections to prevent damage to the connected apparatus.

Moreover, systems of the aforesaid type often include a fluid pressure operated motor carried on the tractor for actuating an implement carried on or connected directly to the tractor, or for other purposes, when it is desired to utilize the force available in the hydraulic system. Such a tractor mounted motor is serially connected in the hydraulic system between the fluid pressure maintaining apparatus and the breakaway coupling. Hence, when the coupling is separated the system is effectively blocked and thus prevents operation of the tractor mounted motor.

An object of the present invention is to provide a multiple breakaway coupling unit for connecting the cooperating sections of each of a plurality of fluid conduits and which is effective upon separation of the cooperating sections to automatically interconnect at least one set of corresponding sections and thereby connect the several conduits.

Another object is to provide a multiple breakaway coupling wherein the sections of the coupling which are to be connected to one set of fluid conduits are rigidly secured together whereby the coupling may be readily supported with the separable portions maintained in predetermined position.

A further object is to provide a multiple self-sealing breakaway coupling unit adapted to connect cooperating sections of each of a plurality of conduits and adapted to permit separation of the cooperating connected conduit sections and upon such separation to seal the ends of all of the conduit sections and at the same time interconnect corresponding conduit sections and thereby interconnect the several conduits.

Still a further object is to provide a self-sealing breakaway coupling unit for a hydraulic system of the type wherein a plurality of hydraulic devices are severally connected by fluid conduits, which coupling unit permits automatic separation of the fluid conduits and consequent disconnection of two portions of the system and which is effective automatically to interconnect corresponding ends of the separated conduits to maintain a closed hydraulic line in at least one portion of the system despite such separation of the conduits.

Another object is to provide a multiple self-sealing breakaway coupling unit for connecting conduit sections in a hydraulic system, which unit is effective upon separation of the conduit sections to seal the separated ends and at the same time bypass the fluid around the source of fluid pressure and establish a closed circuit to thereby prevent the application of excessive fluid pressure to the system.

Another object of the invention is to provide a multiple breakaway coupling unit which is strong and rugged, simple in construction and operation, and effective in action.

A further object is to provide a breakaway coupling having a novel protective casing adapted to enclose the end of the female coupling section when the coupling is in uncoupled condition and thereby prevent the entry of dirt and other foreign matter into the female section.

Other objects and advantages of the invention will appear from the following description taken in connection with the appended drawings wherein:

Figure 1 is a top plan view of a twin coupling unit constructed in accordance with the principles of the present invention, with the couplings in coupled condition;

Fig. 2 is a side elevational view of the structure shown in Fig. 1;

Fig. 3 is an end view of the structure shown in Fig. 1 with both couplings being shown in coupled condition;

Fig. 4 is a side elevational view, somewhat schematic in its representation, showing an illustrative application of the coupling unit of Fig. 1 (the coupling unit being shown as being rotated about its horizontal center line 90° from its usual position, for convenience in illustration);

Fig. 5 is an enlarged horizontal longitudinal sectional view taken through the coupling unit of Fig. 1 showing the coupling sections separated with the complementary parts thereof poised for coupling operation;

Fig. 6 is an enlarged vertical longitudinal sectional view taken substantially along the line 6—6 of Fig. 1;

Fig. 7 is a horizontal longitudinal sectional view taken substantially along the line 7—7 of Fig. 3;

Fig. 8 is a transverse sectional view taken substantially along the line 8—8 of Fig. 5;

Fig. 9 is a top plan view of the twin section of a coupling unit generally similar to that shown in Fig. 1 showing a dust cover associated therewith;

Fig. 10 is a front elevational view of the device of Fig. 9;

Fig. 11 is a side elevational view of the device of Fig. 9;

Fig. 12 is a vertical sectional view taken along the line 12—12 of Fig. 9;

Fig. 13 is a horizontal sectional view through the right hand portion of the device of Fig. 9 with the dust cover flap open; and Fig. 14 is a view generally similar to Fig. 13 but showing the complete coupling in coupled condition.

Although the present invention is capable of many uses, some of which have been briefly outlined previously, it has been illustrated in connection with a hydraulic system associated with tractor-drawn farm implements wherein the earth engaging portions of the implement are hydraulically controlled from the tractor by the operator.

The coupling unit of the present invention is illustrated as a twin unit adapted to connect the cooperating conduit sections of two conduits as the invention finds its principal application in such form. However, the invention is not limited to a coupling for connecting the sections of only two conduits but may, with suitable modification, be designed to connect the sections of a greater number of conduits.

Before entering into a detailed description of the specific mechanism of the coupling unit, reference will first be made to the device in a general way and to one particular application of the invention in order that the detailed structure to be later described will be more readily understood. For this purpose attention is directed first to Figs. 1 to 4 inclusive showing the exterior of the device and its inclusion in a hydraulic system. The twin coupling unit 10 is adapted for coupling fluid conduit sections 12 and 14 together in a single fluid conduit and similarly conduit sections 16 and 18 together in another fluid conduit. A tractor 20 represented diagrammatically in Fig. 4 includes a hydraulic fluid storage tank 22 having a fluid conduit 24 in which is interposed a pump 26 which may be a conventional gear pump. The conduit 24 then leads to a control valve 28 from which the conduit section 12 referred to above leads. The conduit section 14 on the opposite side of the coupling unit communicates with a fluid motor 30 which, in the present instance, includes a cylinder 31 having a piston 32 slidable therein and connected to a connecting rod 34. Leading from the cylinder 31 on the opposite side of the piston is the conduit section 18 referred to above, connected through the coupling unit 10 to the fluid section 16, the latter communicating with another fluid motor 36 which may be similar to the motor 30. Leading from the cylinder of the motor 36 on the side of the piston 32 opposite the rod 34 is another fluid conduit 38 which communicates with the control valve 28. Another fluid conduit 40 communicates between the control valve 28 and the storage tank 22 to complete the hydraulic system. The control valve 28 is provided with well known valve means which can be operated by a control handle 42 for reversing the flow of fluid alternately through the conduits 12 and 38 and thereby alternately reversing the action of the hydraulic motors 30 and 36.

The tractor 20 may be employed for pulling a vehicle such as a farm implement or other earth working implement and the hydraulic motor 30 is utilized for actuating the movable parts on the drawn vehicle while the hydraulic motor 36 may be utilized for operating other devices mounted on the tractor. As is well known, a drawn vehicle may encounter an unusual obstruction and become detached from the tractor and in such case of course it is highly desirable that the fluid conduits of the hydraulic system be disconnected without damage thereto. To this end the coupling unit 10 is constructed so that the conduit sections 14 and 18 will readily part or break away from the coupling unit 10 without damage to any part of the hydraulic system.

It will be noted that the hydraulic motors 30 and 36 are connected in series, that is, they are interconnected on respectively opposite sides of the pistons therein through the fluid conduit 16, 18, the fluid in that conduit flowing from one motor to the other depending upon the direction of movement of the pistons in the motors at the time. If the motor 30 and the conduit sections 14 and 18 should be disconnected or broken away from the remainder of the system, and the conduit sections 12 and 16 are closed by the self-closing valve means provided therefor, fluid pressure would build up in the conduit sections 12 and 16 with consequent damage to the system, if means were not provided for preventing such build-up of pressure. The present invention includes means, to be described later in detail, for interconnecting the conduit sections 12 and 16 through the coupling unit 10 when the conduit sections 14 and 18 are disconnected from the coupling unit, thereby establishing a complete circuit in that portion of the hydraulic system remaining on the tractor. However when the conduit sections 14 and 18 are connected to the coupling unit, communication between the conduit sections 12 and 16 is blocked, and both fluid motors are connected in the hydraulic system in the manner above described.

Referring now in detail to the structure of the coupling unit, the unit includes a block 44 (Fig. 1) which may be a casting, having laterally spaced tubular portions 46 defining bores 48 (Fig. 5) extending therethrough. The tubular portions 46 are interconnected by a transverse piece 50 in which is formed another bore 52 which may be referred to as a transverse passage or bypass and which interconnects bores 48. A reinforcing web 54 may also interconnect the tubular portions. The block 10 preferably is provided with an eye portion 56 to receive a pin or bolt 58 for mounting the block and thereby the coupling unit on the tractor or other intended place. Attention is called to the fact at this point that the block 10 forms the mounting means for the coupling unit and the block is fixedly mounted in position whereby other elements of the unit move relative to the block and cause the fluid conduit sections to be disconnected.

Each of the two bores 48 of the block is adapted for mounting a pair of cooperating coupling sections 59 and 60 which, together with the corresponding portion of the block 44, form a single coupling which constitutes one part of the twin coupling unit. Each of the single couplings herein disclosed is similar in certain respects to and embodies certain novel features of the coupling disclosed and claimed in my copending application Serial No. 95,553 filed May 26, 1949. The cooperating coupling sections in each bore 48 are identical with those in the other, and the following specific description with reference to one of them will be understood to be equally applicable to the other.

Slidably mounted in the bore 48 is a tubular member 61 extending out each end of the bore and having a bore 62 interiorly threaded at one end as at 63 for reception of a rigid end-fitting 64 on the conduit section 12 (or 16). The forward end of the tubular member 61 is provided with an enlarged head 66 having a radially extending portion 67 and a circumferential flange 68 forming a socket 70 which is of enlarged diameter relative to the diameter of the remainder of the tubular portion. A compression spring 72 surrounds the tubular member 61 at the rear end, compressed between the adjacent end of the block 44 and a cup 74 fitted on the tubular member and held in place thereon by a split ring 76 fitted in a groove in the tubular member. The spring 72 urges the tubular member to the left or retracted position (Fig. 5) wherein the head 66 engages the adjacent end of the block 44. In movement of the tubular member 61 in the opposite direction, for a purpose to be described later, the cup 74 will engage the block before the spring 72 is fully compressed and thereby serve as a stop means so as to relieve the spring of that function.

The tubular member 61 is provided with a plurality of radial valve ports 78 establishing communication between the interior of the tubular member and the bore 48 and when the tubular member is in retracted position the valve ports 78 are in communication with the transverse passage 52 both directly and through a circumferential groove or passage 80 in the bore 48 and forming a continuation of the transverse passage 52. Circular sealing rings 82 and 84 or O rings are fitted in annular grooves 86 and 88 respectively on opposite sides of the passage 80 for sealing the tubular member 61. The ring 82 furnishes a seal against the escape of fluid from the bore 48 to the exterior and the ring 84 furnishes a seal against the escape of fluid from the ports 78 into passages 80 and 52 when the tubular member is in advanced position as will be referred to later. Another circular sealing ring 90 or O ring is positioned in a groove 92 in the exterior surface of the tubular member 61 for sealing the device against escape of fluid from the bore 48 to the exterior in the opposite direction.

Adjacent the forward end of the bore 62 is an inwardly extending flange 94 for mounting a circular valve seat 96 for a valve member 98 which closes and seals the corresponding end of the bore 62 when the sections of the coupling unit are separated. The valve member 98 is slidably mounted in the bore 62 and includes an open-ended cylindrical tubular portion 100, a reduced portion 102 having valve ports 104 communicating between the interior of the valve member and the bore 62, and a seating surface 106 adapted to engage the valve seat 96, and finally a forwardly extending projection 108 which projects beyond the flange 94 in the position shown in Fig. 5. The valve member 98 is urged to closed position shown in Fig. 5 by a compression spring 110 extending into the valve member and seated at the opposite end against an annular spring seat 111 supported by a split ring 112 fitted in a circumferential groove in the bore 62. The seat 111 furnishes a stop for limiting movement of the valve to retracted or open position. When the coupling sections are disconnected, the valve 98 is automatically moved to closed position (Fig. 5) for sealing the fluid line section 12 against the escape of fluid. It is moved to open position by the movement of the coupling sections together in the coupling operation, as will be described hereinafter.

Forwardly of the flange 94 is a sealing ring 113 positioned in a groove 114 in the bore of the tubular member 61, for sealingly engaging the coupling unit 60. This sealing action will be described in detail later.

A pair of axially extending locking and stop pins 115 are fixedly secured in holes in the forward end of the block adjacent the bore 48 and extend forwardly through holes 117 in the radially extending portion 67 of the head 66 and into the socket 70. The pins 115 have a sliding fit in the holes 117 and thereby prevent rotation of the coupling section 59 but at the same time permit free movement of the section 59 in an axial direction. The forward ends of the stop pins have reduced extensions 116 forming shoulders 118. The flange 68 is provided with diametrically opposite arcuate slots 120 inclined with respect to both the axis of the tubular member and a line perpendicular thereto in progressively varying extent and in all parts thereof inclined with respect to the two lines mentioned, i. e., no part of the slots is parallel with the axis of the tubular member or with a line perpendicular thereto. The slots 120 form cam surfaces for cooperation with camming elements on the coupling section 60 now to be described in detail.

The coupling section 60 includes a tubular member 122 having a bore 124 interiorly threaded for receiving an end-fitting 126 connected to the conduit section 14 (or 18). The tubular portion 122 includes a portion 128 of reduced diameter and a portion 130 of enlarged diameter, the latter forming a shoulder 132 in which are formed recesses or sockets 134 adapted for receiving the extensions 116 on the stop pins 115 when the coupling sections are coupled. The extended end of the reduced portion 128 has a turned-in flange or bead 136 for mounting a circular valve seat 138. Slidably mounted in the bore 124 is a valve member 140 similar in all respects to the valve member 98 and effective for engaging the valve seat 138 for closing the bore 124 and thereby the line section 14 when the coupling sections are separated. The valve 140 is provided with an extension 142 engageable with the extension 108 on the valve member 98 when the coupling sections are coupled. Radially extending holding and camming studs 144 are secured in the portion 122 of the coupling section 60 for insertion into and cooperation with the cam slots 120 for coupling the sections.

When the coupling sections are disconnected, as shown in Fig. 5, the valve members 140 and 98 are effective for automatically closing the respective conduit sections so that none of the fluid escapes from the hydraulic system. Attention is directed to Figs. 5, 6 and 7 in connection with the following discussion of the method of coupling the coupling sections. Coupling section 60 is moved to the left from the position shown in Fig. 5 and inserted into the socket 70 in such angular position that the camming studs 144 enter the cam slots 120. The coupling section 60 is then rotated and, through the interaction of the cam slots 120 and camming studs 144, the coupling section is moved axially into the socket. The axial movement of the coupling section into the socket causes the face 132 to engage the stop pins 115 and prevents further relative axial movement between the coupling section and the block 44 and, as a consequence, relative movement between the coupling section 60 and the head 66 causes the latter to move outwardly relative to the block against the action of the compression spring 72. This obviously results in the movement of the tubular member 61 to the right from the retracted position of Fig. 5 to the advanced position of Figs. 6 and 7.

When the coupling section 60 is rotated fully so that the camming studs 144 are at the innermost ends of the cam slots (Fig. 1) the recesses 134 are in position to receive the ends 116 of the stop pins 115, the latter action permitting the tubular member 61 and the coupling section 60 together to move as a unit slightly to the left under the action of the spring 72.

Owing to the coaction of the studs 144 and the edges of the seats 120, the coupling section 60 can be removed from the socket 70 only by rotational movement relative to the section 59. That is to say, axial thrust of the coupling unit without rotational movement thereof will result only in the axial thrust being imparted as such to the head 66. Therefore, so long as the pins 115 are retained in the sockets 134 the coupling section 60 is held against rotational movement, and the coupling section is effectively connected to the head 66 and thereby with the coupling section 59. The compression spring 72 urges the tubular member 61 to the retracted position, and therefore urges the coupling section 60 to the left when it is coupled to the head 66, and consequently normally retains the pins 115 in the recesses. In this condition of the coupling the pins hold the coupling section 60 in spaced relation to the block, and thereby the head 66 in similar spaced relation, and additionally retain the coupling section against rotation. To disconnect the coupling sections 59 and 60, the coupling section 60 is drawn to the right until the pins 115 are withdrawn from the recesses 134, after which rotation of the coupling section is permitted.

In the coupling action the valve members 98 and 140 interengage through their respective extensions 108 and 142 and mutually unseat each other as shown in Figs. 6 and 7. The valves are opened simultaneously or sequentially depending upon fluid pressure conditions in the couplings. For example, if pressure exists in the bore 62, but not in the bore 124, the valve member 98 is retained in closed position until the valve 140 opens and reaches its limit stop, whereupon the valve member 98 then opens establishing communication between the bores 62 and 124 and thereby between the fluid line sections 12 and 14 (or 16 and 18).

It will be noted that the sealing ring 113 engages the reduced portion 128 of the coupling section 60 and prevents the escape of fluid to the exterior of the device in that direction during coupling and uncoupling. Thus, the coupling is sealed during coupling, prior to the opening of the valves, and conversely, is sealed during uncoupling until after the valves close.

It will be noted from Figs. 6 and 7 that when the coupling sections are coupled and the tubular member 61 is in advanced position, the valve ports 78 are disposed inwardly of the sealing ring 84 which blocks communication between the bore 62 and the transverse passage 52, thereby preventing communication between the companion fluid lines passing through the twin coupling unit. At this point reference is again made to Fig. 4 and from the above description it will be obvious that when the conduit sections 14 and 18 are connected in the coupling unit the hydraulic system is established in a series arrangement through the two hydraulic motors.

If the implement on which the hydraulic motor 30 is mounted should be disconnected from the tractor and, as a consequence, the conduit sections 14 and 18 be subjected to undue pulling force, the coupling sections 60 on the conduit sections 14 and 18 will immediately be detached from the twin coupling unit. The action is as follows. It will be recalled that each coupling section must be rotated in order to be detached from the respective socket 70 and in normal conditions the pins 115 prevent rotation of the coupling section because a locking effect is established by the spring 72 by which the ends 116 of the pins are retained in the recesses 134. However, when undue pulling force is exerted on a line section such as 14, the force will draw both the coupling section 60 and the tubular member 61 to the right (as viewed in Fig. 1 for example) against the action of the spring 72, this being effected by reason of the fact that the thrust of the camming studs 144 is directed axially as long as the pins 115 are in the recesses 134, as explained above. The force continues until the ends 116 of the locking pins are withdrawn from the recesses, after which rotation of the coupling section is permitted due to the pulling force and the camming action between the camming studs and the cam slots.

After the coupling sections are disconnected from the respective sockets the tubular members 61 are moved by their respective springs to retracted position (Fig. 5) in which the valve ports 78 are in communication with the transverse passage 52, establishing direct communication between the bores 62 of the companion lines through the coupling unit and thereby between the conduit sections 12 and 16 (Fig. 4) whereby a complete circuit is established through the single hydraulic motor 36. It will be understood that when the line sections 14 and 18 are separated, the valve members 98 are automatically moved to closed positions, closing the conduit sections 12 and 16.

As noted above, the block 44 is mounted in fixed position. As a result, any pulling force exerted on the conduit sections 14 and 18 causes relative movement between the coupling sections 59 and 60 and the block permitting disconnection of the coupling sections.

Attention is now directed to Figs. 9 to 14 inclusive showing a portion of a twin coupling unit of the type described above, having a dust cover applied thereto. The coupling unit portion in the present instance includes a block 146 similar in all respects to the block 44 except that instead of the web 54 in the previous embodiment, a cross piece 148 is provided, defining an opening 150 with the remaining elements of the block. The operating parts are identical with those of the previous embodiment and for that reason similar reference numerals are employed in the present instance as to those parts. The open-ended heads 66 form female coupling elements and are exposed when the line sections 14 and 18 are disconnected therefrom, as may be the case when the tractor 20 is used without a drawn implement on which the hydraulic motor 30 is mounted. It is, of course, desired to prevent the accumulation of dust and dirt on the portion of the coupling unit that is mounted on the tractor and exposed.

The dust cover now to be described effectively prevents such accumulation of dust and dirt and includes a shell or skirt portion 152 which, in the construction of the specific illustration of the dust cover, takes the form of a relatively transversely elongated tubular element or skirt surrounding the two heads 66 and secured as by spot welding or by other means to a mounting element 154 which includes a perimeter flange 155 and a planar portion 156 fitted against the face of the block 146 and having appropriate openings for receiving the tubular members 61 and the pins 115. The planar portion 156 is secured rigidly in place by means of a screw 158 threaded in a tapped hole in the cross piece 148. The tubular portion or skirt 152 is open at its extended end, which projects outwardly beyond the open ends of the heads 66. A cover 160 is hingedly mounted at the top as at 162 to the extended edge of the skirt and is adapted to be swung down over the open end of the dust cover to closed position (Figs. 11 and 12) closing the dust cover and thereby effectively closing the sockets in the heads 66. The cover 160 may be provided with reinforcing ribs such as shown at 164 in Fig. 12 and a bead 166 at its lower end engageable with a turned down lip 168 on the skirt for latching the cover in closed position.

When the tractor is used without an implement connected thereto the couplings are disconnected and the cover 160 is moved to closed position for preventing the entry of dust and dirt such as would occur if it were not for the dust cover.

I claim:

1. A twin coupling unit for connecting the adjacent ends of two pairs of fluid conduit sections to establish two fluid lines, said unit comprising a twin coupling section and a pair of single coupling sections cooperable therewith, each single coupling section having a passage therethrough, said twin coupling section including a block portion having a pair of bores formed therein and a passage establishing communication between the bores, a tubular member slidably disposed in each of said bores and having a coupling head designed for detachable coupling engagement with one of said single coupling sections, a valve port in each of said tubular members and movable with the member from a first position wherein the valve port is in communication with said passage to a second position wherein it is out of communication with said passage, means normally maintaining each tubular member in said first position, means for detachably coupling each single coupling section with a respective tubular member, and means operable upon coupling of each single coupling section with a respective tubular member for moving the latter to said second position.

2. A multiple coupling unit comprising a block having a pair of bores extending therethrough and a passage establishing communication between the bores, an open-ended tubular coupling section slidably disposed in each of said bores and having a port formed intermediate its ends, each section being movable from a retracted position wherein the port thereof is in communication with said passage to an advanced position where said port is out of communication with said passage, yieldable means normally urging each of said sections to its retracted position, a second tubular coupling section detachably connectible with each said first tubular coupling section forming a pair of cooperating sections, means for detachably connecting the sections of each said pair together, means reacting between each pair of cooperating coupling sections and said block effective for moving the first said coupling section of the pair to its advanced position in response to coupling movement of the sections, the sections of each said pair being connectible with sections of a fluid line for establishing communication therebetween, and self-closing valve means in each first said coupling section for preventing egress of fluid therefrom when the coupling sections of the respective pair are uncoupled.

3. A multiple coupling unit for fluid conduits comprising a plurality of self-sealing breakaway couplings, each coupling including a pair of cooperating sections, each section having a fluid passage therethrough and being adapted for connection with a fluid conduit for placing its passage in communication with the conduit, means detachably connecting the sections of each pair together and thereby placing the passages therein in intercommunication, each section also having self-closing valve means for closing the passage therein when the sections of the coupling are separated, a unitary member supporting corresponding ones of the sections of the couplings and forming a portion of each such coupling, said unitary member defining a fluid passage interconnecting the passages in the sections supported thereby when the sections of each coupling are separated, each section supported by said supporting member constituting means for closing the passage in the supporting member and being maintained in closing condition in response to coupled condition of the sections of the respective coupling.

4. A multiple coupling unit for fluid conduits comprising a plurality of self-sealing breakaway couplings, each coupling including a pair of cooperating sections, each section having a fluid passage therethrough and being adapted for connection with a fluid conduit for placing its passage in communication with the conduit, means detachably connecting the sections of each pair together and thereby placing the passages therein in intercommunication, each section also having self-closing valve means for closing the passage therein when the sections of the coupling are separated, a unitary member supporting corresponding ones of the sections of the couplings and forming a portion of each such coupling, said unitary member defining a fluid passage interconnecting the passages in the sections supported thereby when the sections of each coupling are separated, and second valve means in each of the sections supported by said supporting member for closing the passage in the supporting member and maintained in closing condition in response to coupled condition of the sections of the respective coupling.

5. A multiple coupling unit for fluid conduits comprising a plurality of self-sealing breakaway couplings, each coupling including a pair of cooperating sections, each section having a fluid passage therethrough and being adapted for connection with a fluid conduit for placing its passage in communication with the conduit, means detachably connecting the sections of each pair together and thereby placing the passages therein in intercommunication, each section also having self-closing valve means for closing the passage therein when the sections of the coupling are separated, a unitary member supporting corresponding ones of the sections of the couplings and forming a portion of each such coupling, said unitary member defining a fluid passage interconnecting the passages in the sections supported thereby when the sections of each coupling are separated, and second valve means in each of the sections supported by said supporting member for closing the passage in the supporting member, said self-closing valve means being moved to open position and said second valve means being moved to closed position simultaneously in response to the coupling movement of the sections of the respective coupling.

6. A multiple coupling unit for fluid conduits comprising a supporting member having a plurality of bores therethrough and a transverse passage connecting said bores, a coupling section in each bore and having a fluid passage therethrough, each coupling section being slidable between a first position wherein the fluid passage therein communicates with the transverse passage and a second position in which said communication is blocked, a second coupling section having a passage therethrough cooperable with each of said first coupling sections, each pair of cooperable coupling sections forming a coupling adapted for connection with conduits, means for releasably interlocking the cooperable sections of each said pair in coupled position and maintaining the said first section thereof in its second position, means yieldingly maintaining each locking means in locking position and effective to urge each first section toward its first position when the sections of each said pair are uncoupled, and self-closing valve means in each section for closing the passage therein when the coupling sections of the respective pairs are uncoupled.

7. A hydraulic coupling unit comprising a block having a pair of bores extending therethrough and a passage establishing communication between the bores, a pair of couplings associated with respective bores and each including an open-ended tubular valve body slidably disposed in a respective bore and having a port formed intermediate its ends, an enlarged head formed on one end of the valve body with an arcuate cam surface thereon and positioned exteriorly of the block, said head having a socket therein for reception of a coupling section, spring means normally urging the valve body to a retracted position wherein the head thereon engages said block and the port therein is in communication with said passage, a thrust pin carried on said block and extending through each head and into the socket therein, a pair of coupling sections each comprising a tubular body and having a cam finger, said tubular body being adapted to be inserted into the socket in the respective valve body and upon rotation thereof in the socket to engage the respective thrust pin and by a camming action between the cam finger and arcuate cam surface draw the valve body from its retracted position to an advanced position wherein its port moves out of communication with said passage.

8. A hydraulic coupling unit comprising a block having a pair of bores extending therethrough and a passage establishing communication between the bores, a pair of couplings associated with respective bores and each including an open-ended tubular valve body slidably disposed in a respective bore and having a port formed intermediate its ends, an enlarged head formed on one end of the valve body with an arcuate cam surface thereon and positioned exteriorly of the block, said head having a socket therein for reception of a coupling section, spring means normally urging the valve body to a retracted position wherein the head thereon engages said block and the port therein is in communication with said passage, a thrust pin carried on said block and extending through each head and into the socket therein, a pair of coupling sections each comprising a tubular body and having a cam finger, said tubular body being adapted to be inserted into the socket in the respective valve body and upon rotation thereof in the socket to engage the respective thrust pin and by a camming action between the cam finger and arcuate cam surface draw the valve body from its retracted position to an advanced position wherein its port moves out of communication with said passage, the end face of the tubular body having a locking recess for reception of the end of the respective thrust pin when the valve body and tubular body are coupled to lock them against relative turning movement.

WALLACE F. MITCHELL.

References Cited in the file of this patent

UNITED STATES PATENTS

| Number | Name | Date |
|---|---|---|
| 488,717 | Pettet | Dec. 27, 1892 |
| 515,220 | Harris et al. | Feb. 20, 1894 |
| 2,043,337 | Smith | June 9, 1936 |
| 2,509,444 | Mitchell | May 30, 1950 |
| 2,538,259 | Merriman | Jan. 16, 1951 |